United States Patent [19]

Mettler

[11] Patent Number: 4,572,022
[45] Date of Patent: Feb. 25, 1986

[54] STEERING COLUMN FOR A MOTOR VEHICLE STEERING MECHANISM AND METHOD OF PRODUCING THE COLUMN

[75] Inventor: Karl Mettler, Triesen, Liechtenstein

[73] Assignee: Etablissement Supervis, Vaduz, Liechtenstein

[21] Appl. No.: 392,122

[22] Filed: Jun. 25, 1982

[30] Foreign Application Priority Data

Jul. 3, 1981 [AU] Australia .............................. 2966/81

[51] Int. Cl.$^4$ .............................................. B62D 1/18
[52] U.S. Cl. ........................................ 74/492; 29/517; 188/67; 403/259; 403/274
[58] Field of Search ..................... 74/492; 29/516, 517, 29/518; 403/284, 274, 259; 188/67, 129

[56] References Cited

U.S. PATENT DOCUMENTS 3,394,612 7/1968 Bogosoff et al. ...................... 74/492
3,504,568 4/1970 Nakamura et al. ................... 74/492
3,757,601 9/1973 Burke ............................. 188/129 X

FOREIGN PATENT DOCUMENTS 438137   8/1972  Australia .
889869   7/1949  Fed. Rep. of Germany ...... 403/274
2108913  9/1971  Fed. Rep. of Germany ........ 74/492
2232836  2/1973  Fed. Rep. of Germany .
2322451  11/1974 Fed. Rep. of Germany ........ 74/492
1587939  4/1970  France .
2085498  12/1971 France .
1170918  11/1969 United Kingdom .
1196738  7/1970  United Kingdom .
1328200  8/1973  United Kingdom .
1524871  9/1978  United Kingdom .
1542127  3/1979  United Kingdom .

Primary Examiner—Allan D. Herrmann
Attorney, Agent, or Firm—Toren, McGeady, Stanger, Goldberg & Kiel

[57] ABSTRACT

In a steering column for a motor vehicle steering mechanism, a tubular first member and a second member are arranged in coaxial and partly coextensive relation. The second member fits into the first member. At least the first member is deformed transversely of the axial direction into gripping surface contact with the second member so that the two members rotate as a unit about their co-axes when the steering column is turned without any axial movement between them up to a given level of applied axial force. Above the given level the members can telescope one into the other in the event of a collision.

6 Claims, 3 Drawing Figures

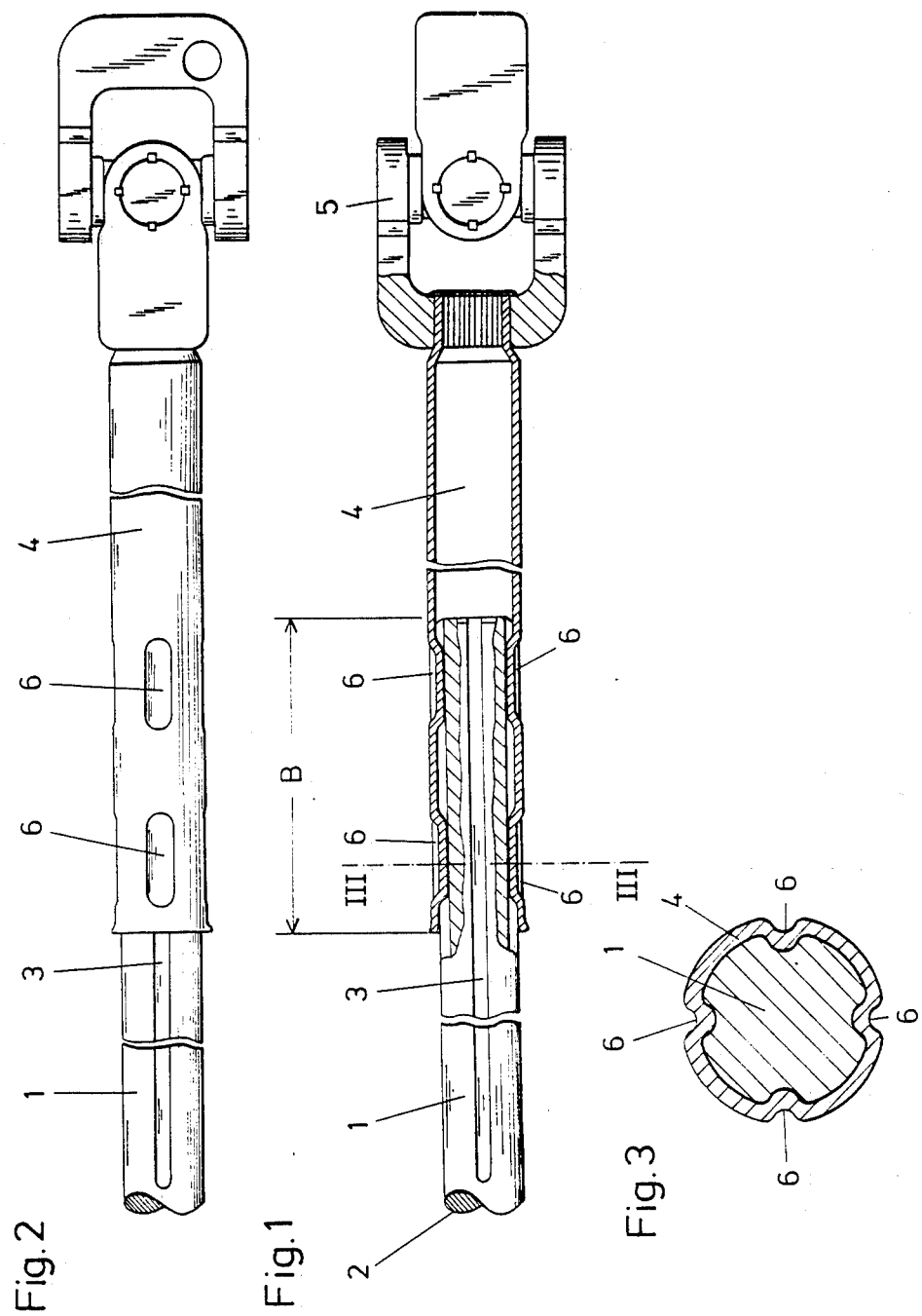

4,572,022

STEERING COLUMN FOR A MOTOR VEHICLE STEERING MECHANISM AND METHOD OF PRODUCING THE COLUMN

SUMMARY OF THE INVENTION

The present invention is directed to a steering column for the steering mechanism in motor vehicles with the steering column formed by two axially extending members arranged coaxially and partly coextensively. At least one of the members is a tubular member into which the other member can be inserted and secured against axial and rotational displacement relative to the tubular member. Further, the present invention is directed to a method of producing a steering column.

In motor vehicle steering mechanisms, the steering column is often made up of two parts. Such a two-part construction assures, in the event of a collision, that the steering column collapses axially and does not pose a threat to the driver.

Steering columns should be produced inexpensively, semifinished products should be used in assembling the steering column and the parts or products used should be as simple and inexpensive as possible. If possible, chip-removing machining should be avoided in the production of such parts to limit the costs. Though the steering column is formed of at least two parts, it should not have any play in the turning or rotational direction of the column and, moreover, if a predetermined axial force is applied to the column as the result of a collision, the column must telescope with the parts moving axially relative to one another. As a result, steering columns should not have any play in the turning or rotational direction so that exact steering can be effected and corresponding driving comfort is ensured. If there is play in the rotational direction of the column it would cause noises which are unpleasant and it would also impair driving comfort.

A known steering column is made up of an elongated tubular member and an elongated rod. The end of the rod is inserted into the tubular member. In the coextensive or telescoping region of the two members, several circumferential grooves are cut in the rod. Boreholes are formed through the tubular member aligned with the circumferential grooves. A castable, curable plastics material is injected through the boreholes into the grooves under high pressure and, after it has cured, it affords a firm connection between the two members. In the event of a collision, the connection is disengageable. In this arrangement, the two members must fit together exactly and they must be worked or treated before they are interconnected, since the surfaces to be juxtaposed must be in closely fitting engagement with one another to prevent the plastics from flowing out of the joint region. There are other known constructions, for example, where the steering column includes universal or Hookes joints, and flange connections. These various steering column assemblies are less pertinent to the present invention than the first mentioned arrangement.

Therefore, it is the primary object of the present invention to provide a steering column of the type described above which can be formed of simple, inexpensive members which require no chip-removing machining. The members forming the column can be provided with a wide range of tolerance and, at the same time, can be interengaged to provide a tightly fitting connection which is free of play in the turning or rotational direction of the column. A steering column of this type is characterized by the secure interconnection of two axially extending members with at least one member being tubular so that it fits or telescopes over the other member and in this coextensive region is permanently deformed into gripping surface contact with the other member. The permanent deformation can be effected, at least partly, by pressing one member against the other. In the interengaged region of the two members they are held without play in the turning or rotational direction of the steering column. Simple, inexpensive members can be utilized for steering columns of this type, for example, the tubular member can be a welded steel pipe and the other member a multi-sided bar or rod. It is also possible to utilize two tubular members for the steering column.

Each of the members is deformed through a stamping or pressing operation where, if necessary, abutment cores are utilized. Next, the members are interconnected by sliding one into the other using a mechanical device. The diameter and parts of the members, which during the assembly into a steering column are directly in effective connection with one another, are adjusted relative to one another so that the parts are in contact under high radial forces and, in the event of a collision, the parts of the members are movable in the longitudinal or axial direction without deformation as soon as a predeterminable axial force acts on them. As soon as the adhesive friction is overcome, the force for further axial movement of the members toward one another considerably decreases. The pressing forces applied to the members are introduced transversely of the axial direction of the members and thus, acting in the radial direction, strain the material beyond its yield point providing a permanent deformation so that at least parts of the members fit tightly one into the other without any play in the rotational direction of the steering column. The shaping or deformation of the members can be effected over the full axial length of the coextensive portions, however, the interengagement can be effected only in certain sections of the coextensive region. The coextensive region of the steering column is that axial portion where the two members are located one within the other. The members are connected together so that there is no play between them in the turning or rotational direction of the steering column. The interconnection of the two members is detachable or disengageable in the event of a collision when a certain predetermined axial force is exceeded with axial movement taking place between the members so that the axial length of the column is reduced. Accordingly, the requirements for steering columns which establish the disengaging force and the pushing or sliding force as well as the tolerance values are provided for. Since the occurrence of a collision cannot be foreseen with regard to the useful life of a steering column, care must be taken that eventual pitting is avoided where the members are in contact with one another. Various measures can be used to avoid such a problem, such as by specially working or treating the surfaces by hardening or thermal treatment. Further, metal coatings or plastic coatings or even a varnish coat can be applied on the coextensive surfaces of the parts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a partial side view, partly in section, of an axially extending steering column embodying the present invention;

FIG. 2 is a side view of the steering column similar to that shown in FIG. 1;

FIG. 3 is a cross-sectional view taken along the line III—III in FIG. 1;

DETAIL DESCRIPTION OF THE INVENTION

In FIGS. 1-3 a steering column for use in the steering mechanism of a motor vehicle is illustrated and includes an elongated solid bar 1 which carries a part, not shown, at its end 2 on which other parts of the steering mechanism are secured, however, they are not essential to the present invention. The solid rod 1 is provided with uniformly angularly spaced axially extending grooves pressed into the outside surface of the rod.

A steel tubular member 4 is connected at one end with a universal joint 5 and other parts of the steering mechanism can be located at the joint. These parts are not essential for the explanation of the invention and are not illustrated. This steel tubular member 4 has a considerable play relative to the rod 1 without deformation of one of the other member.

It would be possible to shape both of the rod 1 and the tubular member 4 before they are joined together by a suitable device. In addition, the material of the tubular member 4 is permanently deformed beyond its yield point and, in addition, tightly adapts or conforms to the configuration of the grooves as is shown in FIG. 3. The press fit of the tubular member 4 with the rod 1 affords a secure interconnection of the two parts without any play in the turning or rotational direction of the steering column. If there is a collision both of the components forming the steering column can telescope one relative to the other causing the column to shorten. In FIG. 1, the telescoped or coextensive region of the rod 1 and the tubular member 4 is designated as region B. To prevent the surfaces of the two parts which are pressed against one another from pitting and/or to make the detaching force and the sliding or pushing force determinable, the surfaces of the coextensive surfaces of the components are surface-treated. Such treatment can be effected by hardening or thermal treatment, and metallic coatings, such as a hard chromium plating, are suitable. Further, plastic coatings and varnish coats can also be used. means of such treatment, it is possible to ensure that the magnitude of the axially detaching force and the sliding force for which the steering column is adjusted at the factory is maintained unchanged during its entire service life.

The tubular member 4 in its original condition is pushed onto an abutment core shaped to correspond to the rod 1 and then to shape the tubular member by applying pressing or stamping forces. After shaping the tubular member, it can be removed from the abutment core and can be placed on the rod 1 using mechanical devices. Both the rod and the tubular member are first shaped by applying stamping or pressing forces and are then interconnected.

In FIG. 3 it is shown that the inside surface of the tubular member 4 is in surface contact with the entire circumferential surface of the rod. Such complete surface contact is not essential for the invention. Partial contact of the two components could be sufficient. In addition to the various shaped sections shown in the drawings, other shapes could be employed, for example, hexagonal, octagonal or rectangular cross-sections. Further, oval pipes could be utilized instead of circular pipes. The inner component of the steering column can be either solid or hollow and it can be preformed as shown in FIGS. 1 and 2 or its final cross-sectional shape can be obtained in a pressing operation. In connection with the treatment or possible additional member insertion between the cooperating surfaces of the components, the axial detaching force and the sliding force can be exactly predetermined. In accordance with the present invention, not only is the steering column of a simple construction but the method of forming the steering column is extremely simple to carry out. For a massproduced article, and such steering columns are classed as mass-produced articles, the method steps disclosed afford extraordinary technical and economic advantages.

While specific embodiments of the invention have been shown and described in detail to illustrate the application of the inventive principles, it will be understood that the invention may be embodied otherwise without departing from such principles.

I claim:

1. Steering column for a steering mechanism used in motor vehicles, said steering column is axially elongated and is formed of at least two axially elongated members arranged coaxially relative to one another, at least one of said members is tubular so that the other said member is inserted into the one said member for an overlapping axially elongated section and is secured in said section against axial and radial displacement, and said one member and said other member in the overlapping axially elongated section have complementary deformed regions produced, said steering column is arranged to collapse telescopically in a collapsing direction after an axially directed force exceeds a given level, wherein the improvement comprises that said other member has an outer surface in said overlapping axially elongated section having grooves formed therein spaced laterally apart and extending parallel with the axis thereof with said grooves extending for the length of said overlapping axially elongated section and extending beyond said overlapping section in the collapsing direction, said one member has axially extending parts permanently deformed beyond the yield point thereof extending radially inwardly into frictional contact with said grooves in said other member so that said one member is secured to said other member without play in the direction of rotation of said steering column about the axis thereof and is in frictional contact at least partially with the outer surface of said other member so that the telescopic collapsing action does not take place until the frictional contact is overcome in the axial direction, said one member has a plurality of axially spaced said parts for each said grooves in said other member with said one member being out of contact with said grooves in said other member between adjacent said parts and said parts deformed in said one member are in interengagement with said grooves in said other member so that said members in said axially extending section are under high radial force, and in the event of a collision said one member and said other member are displaceable in the axial direction relative to one another without deformation and with limited sliding frictional contact between said parts and said grooves.

2. Steering column, as set forth in claim 1, wherein said one and other members in said overlapping axially extending section have a corrosion prevention surface characteristic.

3. Steering column, as set forth in claim 2, wherein the corrosion prevention surface characteristic is provided by hardening.

4. Steering column, as set forth in claim 2, wherein said corrosion prevention surface characteristic includes a thermally treated surface.

5. Steering column, as set forth in claim 2, wherein said corrosion prevention surface characteristic includes a galvanically treated surface.

6. Steering column, as set forth in claim 2, wherein said corrosion prevention surface characteristic comprises a corrosion prevention coating.

* * * * *